US012785187B2

(12) United States Patent
Chopra et al.

(10) Patent No.: US 12,785,187 B2
(45) Date of Patent: Nov. 3, 2026

(54) FILAMENT SEALING LAYER FOR BIODEGRADABLE ELECTROCHEMICAL DEVICE AND METHODS THEREOF

(71) Applicant: Genesee Valley Innovations, LLC, Santa Clara, CA (US)

(72) Inventors: Naveen Chopra, Oakville (CA); Gregory McGuire, Oakville (CA); Edward G. Zwartz, Mississauga (CA); Nan-Xing Hu, Oakville (CA)

(73) Assignee: Genesee Valley Innovations, LLC, Santa Clara, CA (US)

( * ) Notice: Subject to any disclaimer, the term of this patent is extended or adjusted under 35 U.S.C. 154(b) by 857 days.

(21) Appl. No.: 17/805,740

(22) Filed: Jun. 7, 2022

(65) Prior Publication Data

US 2023/0395913 A1 Dec. 7, 2023

(51) Int. Cl.

| | |
|---|---|
| ***H01M 50/193*** | (2021.01) |
| ***B29C 64/118*** | (2017.01) |
| ***B29K 67/00*** | (2006.01) |
| ***B33Y 10/00*** | (2015.01) |
| ***B33Y 70/00*** | (2020.01) |

(Continued)

(52) U.S. Cl.

CPC ......... *H01M 50/193* (2021.01); *B29C 64/118* (2017.08); *B33Y 70/00* (2014.12); *B33Y 80/00* (2014.12); *H01M 50/197* (2021.01); *B29K 2067/046* (2013.01); *B29K 2995/006* (2013.01); *B29K 2995/0069* (2013.01); *B33Y 10/00* (2014.12)

(58) Field of Classification Search

CPC ... H01M 50/193; H01M 50/197; B33Y 70/00; B33Y 80/00; B33Y 10/00; B29C 64/118; B29K 2067/046; B29K 2995/006; B29K 2995/0069

See application file for complete search history.

(56) References Cited

U.S. PATENT DOCUMENTS

| | | | | |
|---|---|---|---|---|
| 10,752,772 B1 | 8/2020 | Kogot et al. | | |
| 2015/0048554 A1* | 2/2015 | Karrer | B29C 48/022 264/494 | |
| 2018/0079132 A1* | 3/2018 | Giesbers | B29C 64/106 | |

(Continued)

FOREIGN PATENT DOCUMENTS

WO WO-2021034899 A1 * 2/2021 ............. C25B 13/08

OTHER PUBLICATIONS

WO2021034899A1—Machine Translation (Year: 2021).*

*Primary Examiner* — Brian R Ohara
*Assistant Examiner* — Patrick Marshall Greene
(74) *Attorney, Agent, or Firm* — MH2 Technology Law Group LLP

(57) ABSTRACT

An electrochemical device is disclosed, including a first substrate layer. The electrochemical device also includes an anode disposed upon the first substrate layer. The device also includes a second substrate layer. The electrochemical device also includes a cathode disposed upon the second substrate layer, and an electrolyte composition disposed between and in contact with the anode and the cathode. The electrochemical device also includes a sealing layer which may include a 3D-printed sealing layer composition disposed between the first substrate layer and the second substrate layer. A 3D-printed sealing layer and a method of producing a sealing layer is disclosed.

10 Claims, 3 Drawing Sheets

(51) Int. Cl.
*B33Y 80/00* (2015.01)
*H01M 50/197* (2021.01)

(56) References Cited

U.S. PATENT DOCUMENTS

| | | | | |
|---|---|---|---|---|
| 2020/0358109 | A1* | 11/2020 | Chopra | H01M 4/26 |
| 2022/0388235 | A1* | 12/2022 | Immonen | C08L 1/02 |
| 2023/0006262 | A1* | 1/2023 | Maruhashi | H01M 50/403 |

* cited by examiner

FILAMENT SEALING LAYER FOR BIODEGRADABLE ELECTROCHEMICAL DEVICE AND METHODS THEREOF

TECHNICAL FIELD

The presently disclosed examples or implementations are directed to biodegradable electrochemical devices, sealing layers thereof, and fabrication methods for the same.

BACKGROUND

The number of batteries being produced in the world is continuously increasing as a consequence of the growing need for portable and remote power sources. Particularly, a number of new technologies require batteries to power embedded electronics. For example, embedded electronics, such as portable and wearable electronics, Internet of Things (IoT) devices, patient healthcare monitoring, structural monitoring, environmental monitoring, smart packaging, or the like, rely on batteries for power. While conventional batteries may be partially recycled, there are currently no commercially available batteries that are environmentally friendly or biodegradable. As such, an increase in the manufacture and use of conventional batteries results in a corresponding increase in toxic and harmful waste in the environment if not properly disposed of or recycled. In view of the foregoing, there is a need to develop improved biodegradable batteries; especially for applications that utilize disposable batteries for a limited time before being discarded.

Further, to meet the demand for flexible, low-cost, medium or low performance batteries, all-printed batteries have been developed. Batteries require moisture to maintain electrolyte activity to deliver current. Maintaining adequate hydration of thin film printed batteries and other electrochemical devices is especially challenging owing to their high surface area and the nature of their assembly. A robust sealing layer or gasket can be used to prevent drying out of the cells and other sections or layers within an electrochemical device. Many adhesives and sealants are non-biodegradable, and do not meet compostability standards to enable a fully compostable battery or electrochemical device. Furthermore, the use of adhesives or glue can be prohibitive in terms of cleanliness and applicability to an all-printed approach to make a thin-film printed battery or electrochemical device.

There is a need for processes to create biodegradable printable sealing layer with good fidelity, (defect-free, controlled thickness, and uniform properties) and electrochemical devices such as batteries made using such processes.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the present disclosure include an electrochemical device. The electrochemical device also includes a first substrate. The device also includes a first electrode disposed upon the first substrate. The device also includes a second substrate. The device also includes a fused deposition modeling (FDM) printed sealing layer disposed between the first substrate and the second substrate.

Implementations of the electrochemical device may include a second electrode disposed upon the first substrate, where the first electrode and the second electrode are disposed in a lateral x-y plane geometry. The first electrode and the second electrode may be disposed in a stacked geometry. The fused deposition modeling (FDM) printed sealing layer composition may include a biodegradable material and forms a moisture barrier around the electrochemical device. The fused deposition modeling (FDM) printed sealing layer composition may include poly(ε-caprolactone) (PCL). The fused deposition modeling (FDM) printed sealing layer composition may include polylactic acid (PLA). The fused deposition modeling (FDM) printed sealing layer composition may include one or more lignins. The fused deposition modeling (FDM) printed sealing layer composition may include polyhydroxybutyrate (PHB). The sealing layer is disposed between the first substrate layer and the second substrate in a laterally non-continuous pattern. The sealing layer may include a first portion and a second portion, the second portion may include a thickness greater than that of the first portion.

A sealing layer composition is disclosed. The sealing layer composition also includes a biodegradable polymer. The sealing layer composition also includes where the sealing layer composition is deposited by fused deposition modeling (FDM). The sealing layer composition can be incorporated into an electrochemical device. The electrochemical device may include a battery. The sealing layer composition may include a biodegradable polymer. The sealing layer composition may include poly(ε-caprolactone) (PCL). The sealing layer composition may include polylactic acid (PLA). The fused deposition modeling (FDM) printed sealing layer composition may include polyhydroxybutyrate (PHB).

A method of producing a sealing layer is also disclosed. The method of producing a sealing layer also includes preparing a substrate. The method of producing a sealing layer also includes dispensing a sealing layer composition onto the substrate using a fused deposition modeling (FDM) printer. The method of producing a sealing layer also includes cooling the sealing layer. The method of producing a sealing layer may include dispensing two or more layers of the sealing layer composition. The method of producing a sealing layer may include removing the cooled sealing layer from the substrate and providing a free-standing sealing layer to construct an electrochemical device. The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

Figure 1:
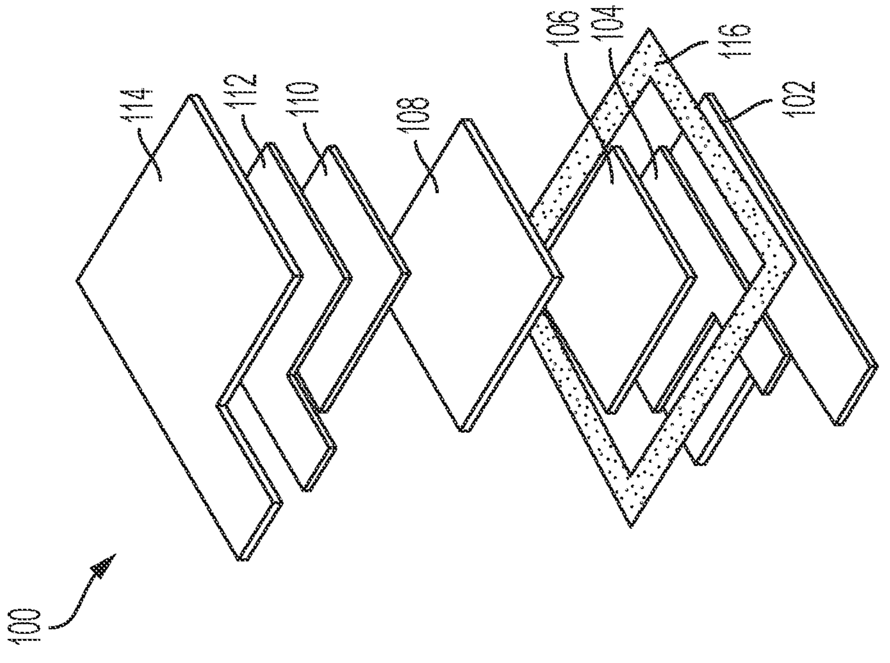
FIG. 1 illustrates an exploded view of an exemplary electrochemical device in a stacked configuration, in accordance with the present disclosure.

It should be noted that some details of the figures have been simplified and are drawn to facilitate understanding of the present teachings rather than to maintain strict structural accuracy, detail, and scale.

DETAILED DESCRIPTION

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes examples containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

Reference will now be made in detail to exemplary examples of the present teachings, examples of which are illustrated in the accompanying drawings. Wherever possible, the same reference numbers will be used throughout the drawings to refer to the same, similar, or like parts.

A biodegradable electrochemical device is disclosed herein. As used herein, the term "biodegradable" or "biodegradable material" may refer to a material, component, substance, device, or the like, capable of or configured to be decomposed by living organisms, particularly microorganisms in a landfill within a reasonable amount of time. The material, component, substance, device, or the like may be decomposed into water, naturally occurring gases like carbon dioxide and methane, biomass, or combinations thereof. As used herein, the expression "biodegradable electrochemical device" or "biodegradable device" may refer to an electrochemical device or a device, respectively, where at least one or more components thereof is biodegradable. In some instances, a majority or substantial number of the components of the biodegradable electrochemical device or the biodegradable device are biodegradable. In other instances, all of the polymer components of the biodegradable electrochemical device or the biodegradable device are biodegradable. For example, the polymers and/or other organic-based components of the electrochemical device are biodegradable while the inorganic materials of the electrochemical device disclosed herein, including the metals and/or metal oxides, may not be biodegradable. It should be appreciated that if all polymer and/or organic-based components of an electrochemical device are biodegradable, it is generally accepted that the complete electrochemical device is considered biodegradable. As used herein, the term "compostable" may refer to items that are able to be made into compost or otherwise disposed of in a sustainable or environmentally friendly manner. Compostable materials may be considered to be a subset category of biodegradable materials wherein additional specific environmental temperatures or conditions may be needed to break down a compostable material. While the term compostable is not synonymous with biodegradable, they may be used interchangeably in some instances, wherein the conditions necessary to break down or decompose a biodegradable material are understood to be similar to the conditions necessary to break down a compostable material. As used herein, the term or expression "electrochemical device" may refer to a device that converts electricity into chemical reactions and/or vice-versa. Illustrative electrochemical devices may be or include, but are not limited to, batteries, dye-sensitized solar cells, electrochemical sensors, electrochromic glasses, fuel cells, electrolysers, or the like.

As used herein, the term or expression "environmentally friendly electrochemical device" or "environmentally friendly device" may refer to an electrochemical device or device, respectively, that exhibits minimal, reduced, or no toxicity to the ecosystems or the environment in general. In at least one example, the electrochemical devices and/or components thereof disclosed herein are environmentally friendly.

As used herein, the term or expression "film" or "barrier layer" may refer to a thin, partially or substantially plastic and/or polymeric material that may be used in various electrochemical device components or parts, including, but not limited to substrates, connections, enclosures, barriers, or combinations thereof. Films as described herein may be rigid or flexible, depending upon the inherent physical properties or dimensions of their respective compositions. In at least one example, these films or barrier layers may be environmentally friendly or biodegradable As used herein, the term or expression "enclosure," "barrier," or "water vapor barrier" may refer to materials utilized in partially sealed, fully sealed or otherwise used to prevent moisture, water or other volatile materials from entering or exiting via the barrier of an electrochemical device. In at least one example, these enclosures may be environmentally friendly or biodegradable.

In at least one example, the electrochemical device disclosed herein may include an anode, a cathode (i.e., a current collector and/or an active layer), and one or more electrolyte compositions (e.g., a biodegradable solid aqueous electrolyte composition). In another example, the biodegradable electrochemical device may further include one or more substrates, one or more seals, one or more packages, one or more pouches, one or more enclosures, or combinations thereof.

The electrochemical devices disclosed herein may be flexible. As used herein, the term "flexible" may refer to a material, device, or components thereof that is capable of being bent around a predetermined radius of curvature without breaking and/or cracking. The biodegradable electrochemical devices and/or the components thereof disclosed herein may be bent around a radius of curvature of about 30 cm or less, about 20 cm or less, about 10 cm or less, about 5 cm or less without breaking or cracking.

As used herein, the term "biopolymer" refers to a macromolecule containing a plurality of repeating monomer units that is synthesized by a biological organism. Synthetic variants are also encompassed by the term "biopolymer," provided that the synthetic biopolymer is functionally similar to a corresponding natural biopolymer.

As used herein, the term "biomineral" refers to an inorganic compound or a composite of an inorganic compound that is mineralized by a biological organism. Synthetic variants are also encompassed by the term "biomineral," provided that the synthetic biomineral is functionally similar to a corresponding natural biomineral.

Exemplary examples of a 3D printed filament-based sealing layer composition or a sealing layer deposited by fused deposition modeling (FDM) printing methods may include compositions as described herein, and can be included in an electrochemical device, such as a battery, or a biodegradable battery. Sealing layers within an electrochemical device can provide a barrier layer around the periphery of the electrochemical device, thereby encapsulating the electrochemical device. The sealing layer can provide a barrier to prevent or reduce moisture loss or moisture evaporation from one or more components within an electrochemical device. Alternate examples of devices or apparatus including a sealing layer composition as described herein may include, but are not limited to, carbon capture or carbon dioxide reduction devices, galvanic cells, or electrolyzers. While an electrolyzer is a system that can utilize electricity to break water into hydrogen and oxygen in an electrolysis process, other systems that enact a chemical process with the use of electricity may incorporate 3D printed biodegradable filament-based sealing layer compositions as described herein.

FIG. 1 illustrates an exploded view of an exemplary electrochemical device in a stacked configuration, in accordance with the present disclosure. As illustrated in FIG. 1, the electrochemical device 100 may include a first substrate 102, a first current collectors 104 disposed adjacent to or on top of the first substrate 102, an anode active layer 106 disposed adjacent to or on top of the first current collector 104, an electrolyte layer 108 disposed adjacent to or on top of the anode 106, a cathode active layer 110 disposed adjacent to or on top of the electrolyte composition 108, a second current collector 112 disposed adjacent to or on top of the cathode active layer 110, and a second substrate 114 disposed adjacent to or on top of the second current collector 112. It should be appreciated that the first current collector 104 and the anode active layer 106 may be collectively referred to herein as an anode of the electrochemical device 100. It should further be appreciated that the second current collector 112 and the cathode active layer 110 may be collectively referred to herein as a cathode of the electrochemical device 100. As illustrated in FIG. 1, the anode and the cathode of the electrochemical device 100 may be arranged in a stacked geometry or configuration such that the anode and the cathode are disposed on top of or below one another.

In certain examples, the electrochemical device 100 may include one or more seals 116, capable of or configured to hermetically seal the current collectors 104, 106, the anode active layer 106, the cathode active layer 110, and the electrolyte composition 108 between the first and second substrates 102, 114 of the electrochemical device 100. For example, as illustrated in FIG. 1, the biodegradable electrical device 100 may include a seal 116 interposed between the first and second substrates 102, 114 and about the current collectors 104, 112, the anode active layer 106, the cathode active layer 110, and the electrolyte composition 108 to hermetically seal the biodegradable electrochemical device 100. For example, the substrates 102, 114 may be melted or bonded with one another or by melting or bonding with the seal 116 to seal the biodegradable electrochemical device 100. In still other examples, each of the current collectors 104, 106, may include a respective tab that may extend outside the body of the electrochemical device 100 to thereby provide connectivity. In some examples, the electrochemical device 100 may be arranged in a side-by-side or coplanar configuration. Further, the anode and the cathode of the electrochemical device 100 may be coplanar such that the anode and the cathode are arranged along the same X-Y plane, with a seal surrounding and sealing both in that same plane.

In at least one example, any one or more of the substrates of the electrochemical device 100 may be or include, but is not limited to, a biodegradable substrate. Illustrative biodegradable substrates may be or include, but are not limited to, one or more of polylactic acid (PLA), polylactic-co-glycolic acid (PLGA), silk-fibroin, chitosan, polycaprolactone (PCL), polyhydroxybutyrate (PHB), rice paper, cellulose, or combinations or composites thereof.

The anode active layer 106 of exemplary biodegradable electrochemical devices 100 may be or include, but are not limited to, one or more of zinc (Zn), lithium (Li), carbon (C), cadmium (Cd), nickel (Ni), magnesium (Mg), magnesium alloys, zinc alloys, or the like, or combinations and/or alloys thereof. Illustrative anode active layers or materials thereof may be or include, but are not limited, or the like, or combinations thereof. In at least one example, the anode active layer may include zinc oxide (ZnO) in a sufficient amount to regulate or control $H_2$ gassing.

In at least one example, the anode active layer 106 of exemplary biodegradable electrochemical devices 100 may be prepared or fabricated from an anode paste. For example, the anode active layer may be prepared from a zinc anode paste. The anode paste may be prepared in an attritor mill. In at least one example, stainless steel shot may be disposed in the attritor mill to facilitate the preparation of the anode paste. The anode paste may include one or more metal or metal alloys, one or more organic solvents, one or more styrene-butadiene rubber binders, or combinations thereof. In an exemplary example, the anode paste may include one or more of ethylene glycol, a styrene-butadiene rubber binder, zinc oxide (ZnO), bismuth (III) oxide ($Bi_2O_3$), Zn dust, or combinations thereof. Illustrative organic solvents are known in the art and may be or include, but are not limited to, ethylene glycol, acetone, NMP, or the like, or combinations thereof. In at least one example, any one or more biodegradable binders may be utilized in lieu of or in combination with a styrene-butadiene rubber binder.

The cathode active layer 110 of exemplary biodegradable electrochemical devices 100 may be or include, but are not limited to, one or more of iron (Fe), iron (VI) oxide, mercury oxide (HgO), manganese (IV) oxide ($MnO_2$), carbon (C), carbon-containing cathodes, gold (Au), molybdenum (Mo), tungsten (W), molybdenum trioxide ($MoO_3$), silver oxide ($Ag_2O$), copper (Cu), vanadium oxide ($V_2O_5$), nickel oxide (NiO), copper iodide ($Cu_2I_2$), copper chloride (CuCl), or the like, or combinations and/or alloys thereof. In an exemplary example, the cathode active layer 110 may include manganese (IV) oxide. The carbon and/or carbon-containing cathode active layers may be utilized in aqueous metal-air batteries, such as zinc air batteries.

In at least one example, the cathode active layer 110 may include one or more additives capable of or configured to at least partially enhance the electronic conductivity of the cathode active layer 110. Illustrative additives may be or include, but are not limited to, carbon particles, such as graphite, carbon nanotubes, carbon black, or the like, or the like, or combinations thereof.

In at least one example, the cathode active layer 110 of an exemplary biodegradable electrochemical device 100 may be prepared or fabricated from a cathode paste. For example, the cathode active layer 110 may be prepared from a manganese (IV) oxide cathode paste. The cathode paste may be prepared in an attritor mill. In at least one example, stainless steel shot may be disposed in the attritor mill to facilitate the preparation of the cathode paste. The cathode paste may include one or more metal or metal alloys, one or more organic solvents (e.g., ethylene glycol), one or more styrene-butadiene rubber binders, or combinations thereof. In an exemplary example, the cathode paste may include one or more of ethylene glycol, a styrene-butadiene rubber binder, manganese (IV) oxide ($MnO_2$), graphite, or combinations thereof. Illustrative organic solvents are known in the art and may be or include, but are not limited to, ethylene glycol, acetone, NMP, or the like, or combinations thereof. In at least one example, the one or more organic solvents may be replaced or used in combination with an aqueous solvent, such as water. For example, water may be utilized in combination with manganese (IV) oxide.

In at least one example, each of the anodes and the cathodes, or the active layers 106, 110 thereof may independently include a biodegradable binder. The function of the biodegradable binder is to anchor the particles of each of the respective layers together and provide adhesion to the substrate underneath, the respective layers being the anode current collector 104, the cathode current collector 112 the anode active layer 106, the cathode active layer 110, or combinations thereof. Illustrative biodegradable binders may be or include, but are not limited to, one or more of chitosan, polylactic-co-glycolic acid (PLGA), gelatin, xanthan gum, cellulose acetate butyrate (CAB), polyhydroxybutyrate (PHB), or a combination thereof. In at least one example, any one or more of the biodegradable polymers disclosed herein with regard to the electrolyte composition may also be utilized as the biodegradable binder of the anode, the cathode, components thereof, or any combination thereof. As further described herein, the one or more biodegradable polymers may be cross-linked. As such, the biodegradable binders utilized for the anode, the cathode, and/or the components thereof, may include the cross-linked biodegradable binders disclosed herein with regard to the electrolyte composition.

The electrolyte layer 108 of exemplary biodegradable electrochemical devices 100 may be or include an electrolyte composition. The electrolyte composition may utilize biodegradable polymeric materials. The electrolyte composition may be a solid, aqueous electrolyte composition. The solid, aqueous electrolyte composition may be or include a hydrogel of a copolymer and a salt dispersed in and/or throughout the hydrogel. The copolymer may include at least two polycaprolactone (PCL) chains attached with a polymeric center block (CB). For example, the copolymer may be a block copolymer or a graft copolymer including at least two PCL chains coupled with the polymeric center block, such as PCL-CB-PCL. In another example, the copolymer may be a block copolymer or a graft copolymer including at least one or more of polylactic acid (PLA), polyglycolic acid (PGA), polyethylene imine (PEI) or combinations thereof, coupled with the polymeric center block.

The polymeric center block of the copolymer may be a biodegradable polymer, thereby improving or increasing biodegradability of the solid, aqueous electrolyte composition. The biodegradable polymer of the polymeric center block is preferably naturally occurring. The polymeric center block may be or include, or be derived from, a polymer, such as a biodegradable polymer, including at least two free hydroxyl groups available for reaction with ε-caprolactone, in a non-limiting example.

In at least one example, the polymeric center block of the copolymer may not be a biodegradable polymer. For example, the polymeric center block of the copolymer may be or include, but is not limited to, polyethylene glycol (PEG), hydroxy-terminated polyesters, hydroxyl-terminated polyolefins, such as hydroxy-terminated polybutadiene, or the like, or combinations thereof.

The copolymer, including at least two polycaprolactone (PCL) chains bonded to the polymeric center block, may be a graft copolymer or a block copolymer. Whether the copolymer is a graft copolymer or a block copolymer may be at least partially determined by the number and/or placement of the at least two free hydroxyl groups of the polymeric center block. For example, reacting ε-caprolactone with polymeric center blocks having the hydroxyl groups on monomers along a length of the polymeric center block chain forms graft copolymers. In another example, reacting ε-caprolactone with polymeric center blocks having each of the hydroxyl groups at respective ends of the polymeric center blocks forms block copolymers. Illustrative block copolymers may be or include triblock copolymers, tetrablock copolymers, star block copolymers, or combinations thereof.

The salt may be present in an amount capable of, configured to, or sufficient to provide ionic conductivity. In at least one example, the electrolyte composition may include one or more additives. The one or more additives may be or include, but are not limited to, biodegradable or environmentally friendly nanomaterials. The biodegradable nanomaterials may be capable of or configured to provide and/or improve structural strength of the electrolyte layer or the electrolyte composition thereof without sacrificing flexibility of the electrolyte layer or the electrolyte composition thereof. In at least one example, the electrolyte composition may include an aqueous solvent. For example, the electrolyte composition may include water. In at least one example, the electrolyte composition may include a co-solvent. For example, the electrolyte composition may include water and an additional solvent.

The current collectors 104, 112 of exemplary biodegradable electrochemical devices 100 may be capable of or configured to receive, conduct, and deliver electricity. Illustrative current collectors 104, 112 may be or include, but are not limited to, silver, such as silver microparticles and silver nanoparticles, carbon, such as carbon black, graphite, carbon fibers, carbon nanoparticles, such as carbon nanotubes, graphene, reduced graphene oxide (RGO), or the like, or any combination thereof.

An exemplary material for use in a filament-based 3D printed or fused deposition modeling (FDM) sealing layer composition may include a compostable or biodegradable polymer filament or material. Non limiting examples of suitable 3D printable filament compositions and methods of manufacture for creating compostable or biodegradable batteries using a printed filament approach to create a sealing layer composition and sealing layer can include the use of biodegradable materials such as cellulose acetate, cellulose acetate butyrate, cellulose acetate propionate, cellulose nitrate, polyhydroxyalkanoates (PHA) such as polyhydroxybutyrate (PHB), poly(3-hydroxy valerate), and poly(3-hydroxybutyrate-co-3-hydroxyvalerate), polylactic acid (PLA), polyglycolic acid (PGA), poly(ε-caprolactone) (PCL), starch, and chitosan, as well as combinations thereof. Examples of a filament-based 3D printed or fused deposition modeling (FDM) sealing layer compositions may alternatively include partially bio-based and biodegradable polymers such as polybutylene succinate, poly(butylene adipate-co-terephthalate), PLA blends, and starch blends; and fossil fuel-based and biodegradable polymers such as polybutylene succinate, poly(butylene adipate-co-terephthalate), poly(butylene succinate-co-lactide), poly(butylene succinate-co-terephthalate), poly(ε-caprolactone), polyglycolide, poly(methylene adipate-co-terephthalate), and polyvinyl alcohol. Biodegradable materials such as polylactic acid (PLA), BioFila Linen Filament (lignins in a PLA matrix), Willow-Flex (an elastomeric bioplastic) and NonOilen® (a PLA-PHB (polyhydroxybutyrate) blend from Filamentum) are examples which are commercially available. Additional suitable filament materials can include filaments made from polymers from renewable resources having high strength, toughness, hardness, temperature resistance properties up to 120° C., and polymer filaments that are biodegradable and/or compostable.

Figure 2:
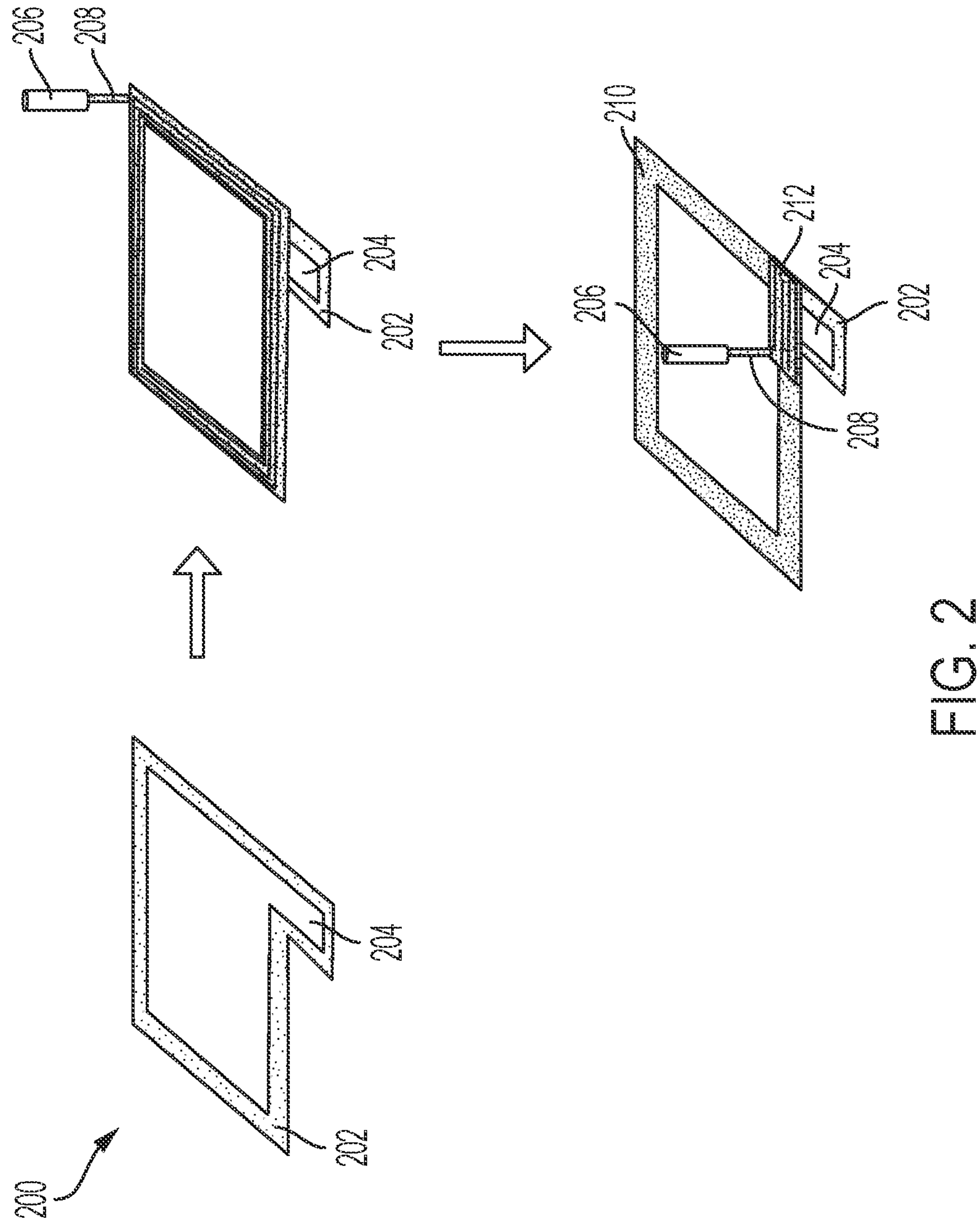
FIG. 2 illustrates a schematic of a process for providing a sealing layer for an electrochemical device using a filament-based 3D printing process, in accordance with the present disclosure.

FIG. 2 illustrates a schematic of a process for providing a sealing layer for an electrochemical device using a filament-based 3D printing process, in accordance with the present disclosure. While this is an example schematic view of a filament-based 3D printing process 200 suitable for dispensing a sealing layer for an electrochemical device, other means of dispensing a sealing layer or sealing layer composition in accordance with the present disclosure may be employed. The process shown and described in regard to FIG. 2 illustrates a process for 3D printing biodegradable powders making up a sealing layer composition to create a sealing layer, with an added feature of building up thicker reinforcing layers for critical sealing layer areas such as the electrode tabs of a battery and other areas, where leakages often occur. The filament-based 3D printing process 200 includes a sealing layer composition deposition head 206 used to provide a sealing layer composition 208 onto a substrate layer 202 having an electrode 204 disposed upon the substrate 202. Once the substrate is prepared, the sealing layer composition 208 is provided to the deposition head 206 from a filament form, which is melted prior to or while present in the deposition head 206. Next, the sealing layer composition is dispensed onto the substrate and onto the electrode 204 as well. In certain examples, as shown herein, the sealing layer composition is disposed around a perimeter of the substrate 202, which can also correspond to a perimeter of the entire electrochemical device. Next, the sealing layer composition 208 is allowed to cool, to form a solidified or cooled sealing layer 210. It should be noted that by this filament-based 3D printing process 200, sealing layer composition 208 is only deposited in areas where sealing is desired or required by the electrochemical device design parameters. Additional layers of sealing layer composition 208, for example, to dispense a total of two or more layers, are deposited by the sealing layer composition deposition head 206 in areas where an additional reinforcement 212 of a sealing layer is desired. These additional layers of sealing layer composition 208 are then cooled to adhere the finished reinforcement 212 of a sealing layer to any previously deposited or cooled sealing layer 210. Building up thicker or additional reinforcement 212 layers can be advantageous for critical sealing layer areas such as the electrode tabs of a battery, where leakages often occur, for example. In certain examples, the sealing layer has a first portion and a second portion, the second portion having a thickness greater than that of the first portion. The layers of sealing layer composition may be disposed in a laterally non-continuous pattern. That is to say, the deposition and cooling of a sealing layer composition can only partially cover the substrate or other surface onto which it is deposited and can be deposited according to a non-continuous pattern. The movement and operation of the sealing layer composition deposition head 206 or even a platform holding the substrate layer 202 may be externally controlled by instructions received from the computer processing unit to provide a desired pattern and quantity of a deposited or dispensed of a sealing layer composition. In exemplary examples, additional heating or pressure can be applied to the sealing layer composition 208, cooled sealing layer 210, or reinforcement layer 212 of sealing layer composition 208 either with or without additional layers of a complete electrochemical device, to provide an effective sealing layer for an electrochemical device according to the present disclosure. In certain examples, other materials such as additives or adhesives may be used to enhance or improve sealing performance or adhesion of the sealing layer composition 208 to other materials within an electrochemical device. In certain examples, the thickness of the sealing layer for electrochemical devices is from about 50 m to about 1 mm, from about 250 m to about 1 mm, or from about 500 m to about 1 mm.

The material composition used for the fused deposition modeling printed sealing layer composition can include one or more biodegradable polymers, melt flow properties, conformability, a melting point associated with the composition, melting and/or flowing properties, or a combination of one or more of the aforementioned properties can be advantageous when employed within a fused deposition modeling printed sealing layer composition for an electrochemical device. The use of a fused deposition modeling printing process with such materials further provides advantages for a fused deposition modeling printed sealing layer composition for an electrochemical device. For example, as a fused deposition modeling printed sealing layer composition is heated within the printer, the phase of the material changes from a solid filament to a liquid or flowable material, which is then subsequently cooled to provide a formed sealing layer where interstitial gaps between filaments are cooled to fill or pack neighboring filament depositions together to form the sealing layer, providing a more effective barrier to moisture escape from an electrochemical device. In certain aspects of the present disclosure, a so-called corduroy effect, or row-by-row signature trails, or melting and cooling between rows of filaments will be observable, while fully welded and providing the benefits of a fully processed sealing layer, may still exhibit detectable welding artifacts in a sealing layer when viewed under certain analytical techniques, for example, light microscopy. Furthermore, a layer of deposited filament may overlap a previously deposited layer of filament, thus overlapping one another, and providing an effective sealing or moisture barrier layer Material properties of sealing layers of the present disclosure may include a range of rubbery to plastic properties depending on the particular electrochemical device design and the particular sealing layer composition.

Figure 3:
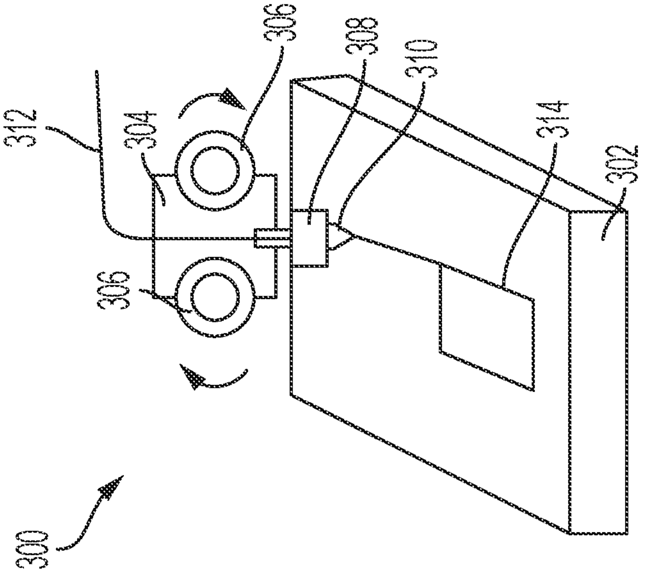
FIG. 3 illustrates a schematic of a process for providing a sealing layer for an electrochemical device using a filament-based 3D printing process, in accordance with the present disclosure.

FIG. 3 illustrates a schematic of a process for providing a sealing layer for an electrochemical device using a filament-based 3D printing process, in accordance with the present disclosure. The method of producing a sealing layer using a filament-based 3D printing process 300 includes a dispensing station 304 where the dispensing station 304 has one or more feed wheels 306 or in certain examples another distribution mechanism for advancing or introducing a biodegradable filament-based sealing layer composition 312 into a dispensing head 308. The dispensing head may include heating elements and is in fluid communication with a nozzle 310 which directs, dispenses, and delivers the filament sealing layer composition 312 onto a platform or substrate 302. In one exemplary example, the substrate 302 may move in an x-y plane or a z-direction to direct the shape or areas of dispensing of the sealing layer composition 312. In certain examples, the substrate 302 is stationary and the dispensing station 304 may move in an x-y plane or a z-direction to direct the shape or areas of dispensing of the sealing layer composition 312 onto the substrate 302. In certain processes, a combination of both substrate 302 motion and dispensing head 304 motion may be employed. In the method of producing a sealing layer using a filament-based 3D printing process 300, a free-standing sealing layer 314 is produced. The free-standing sealing layer 314 can be removed or released from the temporary substrate 302 and used to provide a sealing layer 314 for an electrochemical device. In this example additional layers as described previously may also be provided to reinforce known areas of weakness or areas that encounter additional stresses or flexing during use or fabrication of the electrochemical device to minimize moisture loss from the electrochemical device in many production or use situations. To fully incorporate the free-standing sealing layer 314 into an electrochemical device, the free-standing sealing layer 314 may be placed between two layers in an electrochemical device and fused or laminated within the device to construct a biodegradable sealing layer within a biodegradable electrochemical device in a downstream process. The sealing layer fabrications processes described herein may be performed alone or within an integrated process for complete printing of a biodegradable battery or electrochemical device. 3D-printed biodegradable sealing layer materials or compositions comprised of polylactic acid (PLA), BioFila Linen Filament (lignins in a PLA matrix) from twoBEars, Germany, or Willow-Flex, an elastomeric bioplastic, from https://www.willow-flex.com, may be used in a fused deposition modeling or printing process to create biodegradable battery sealing layers, either in situ, or by fabricating a sealing layer 'frame' with customizable thickness that can be used to seal a biodegradable printed battery or biodegradable electrochemical device. Electrochemical devices, 3D printed batteries, or other devices in accordance with the present disclosure provide a sealing layer composition and process to provide a sealing layer having a variable thickness to minimize moisture loss within the electrochemical device and therefore provide a more effective moisture barrier around the periphery of an electrochemical device.

EXAMPLES

Printing of a sealing layer composition using a 3D printable biodegradable filament using fused deposition modeling (FDM) printing was carried out using a Hyrel Hydra 16A 3D printer that is configurable for operating a variety of print heads to dispense different types of materials, such as filament, paste, as well as other materials. For this example, a MIK1-250 print head which prints 1.75 mm filament with a maximum operating temperature of 250° C. (larger diameter filament, flexible filament and higher temperature print heads are also available) was placed into a slot on the tool yoke of the printer. PLA filament, PCL filament, and Biofila® filament were loaded into filament print head with 0.5 mm diameter nozzle tip to print sealing layers using the various sealing layer compositions.

A test pattern of a sealing layer to be printed was constructed using OpenScad software to create the 3D object and export to an STL file format. The sealing layer object dimensions included a 50 mm outer wall, 44 mm inner wall, and 0.6 mm height. G-Code was generated with Slic3r slicing software, although other slicing software such as PrusaSlicer or Simplify3D may also be used, for the STL file with mostly default parameters. Printing speed was set to 20 mm/s, layer height to 0.2 mm and 100% infill in this example. Temperature for the glass print bed surface was set to 60° C. and the print head temperature set to 190° C. for PLA and Biofila®. PCL filament was printed onto a room temperature substrate and extrusion temperature of 100° C. Other 3D printers or print heads may use different print process conditions. A section of PLA sheet was taped onto a glass bed before printing started and the operating instructions for start-up, z-calibration, etc., of the printer were followed to print the object. Alternative examples may include printing of the border 'frame' sealing layer that can be removed from the substrate and pressed into the battery or electrochemical device in a downstream operation. Examples as thick as 600 m thick have been demonstrated in printing and removal from the substrate after printing, while printing at filament temperature ranges from about room temperature to about 70° C.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or examples of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither “on” nor “over” implies any directionality as used herein. The term “conformal” describes a coating material in which angles of the underlying material are preserved by the conformal material. The term “about” indicates that the value listed may be somewhat altered, as long as the alteration does not result in nonconformance of the process or structure to the illustrated example. The terms “couple,” “coupled,” “connect,” “connection,” “connected,” “in connection with,” and “connecting” refer to “in direct connection with” or “in connection with via one or more intermediate elements or members.” Finally, the terms “exemplary” or “illustrative” indicate the description is used as an example, rather than implying that it is an ideal. Other examples of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An electrochemical device, comprising:

a first substrate;

a first electrode disposed upon the first substrate;

a second substrate; and a fused deposition modeling (FDM) printed sealing layer disposed between the first substrate and the second substrate; and wherein:

a sealing layer composition of the fused deposition modeling (FDM) printed sealing layer comprises cellulose nitrate, poly(3-hydroxy valerate), poly(3-hydroxybutyrate-co-3-hydroxyvalerate, or a combination thereof.

2. The electrochemical device of claim 1, further comprising a second electrode disposed upon the first substrate, wherein the first electrode and the second electrode are disposed in a lateral X-Y plane geometry.

3. The electrochemical device of claim 1, further comprising a second electrode disposed upon the second substrate, wherein the first electrode and the second electrode are disposed in a stacked geometry.

4. The electrochemical device of claim 1, wherein the fused deposition modeling (FDM) printed sealing layer composition further comprises a biodegradable material and forms a moisture barrier around the electrochemical device.

5. The electrochemical device of claim 1, wherein the fused deposition modeling (FDM) printed sealing layer composition further comprises poly(ε-caprolactone) (PCL) or cellulose acetate propionate.

6. The electrochemical device of claim 1, wherein the fused deposition modeling (FDM) printed sealing layer composition further comprises polylactic acid (PLA).

7. The electrochemical device of claim 6, wherein the fused deposition modeling (FDM) printed sealing layer composition further comprises one or more lignins.

8. The electrochemical device of claim 1, wherein the fused deposition modeling (FDM) printed sealing layer composition further comprises polyhydroxybutyrate (PHB).

9. The electrochemical device of claim 1, wherein the sealing layer is disposed between the first substrate layer and the second substrate in a laterally non-continuous pattern.

10. The electrochemical device of claim 1, wherein the sealing layer comprises a first portion and a second portion, the second portion comprising a thickness greater than that of the first portion.

* * * * *